United States Patent [19]

Smith

[11] Patent Number: 4,481,409

[45] Date of Patent: Nov. 6, 1984

[54] METHOD AND APPARATUS FOR LIMITING THE EVAPORATION RATE OF LIQUIDS HEATED BY COOKING APPLIANCE SURFACE UNITS

[75] Inventor: Peter H. Smith, Anchorage, Ky.

[73] Assignee: General Electric Company, Louisville, Ky.

[21] Appl. No.: 438,770

[22] Filed: Nov. 3, 1982

[51] Int. Cl.$^3$ ............................................. H05B 1/02
[52] U.S. Cl. ................................. 219/518; 219/497; 219/506; 219/432; 73/76; 426/237; 426/520
[58] Field of Search ............... 219/518, 497, 10.55 R, 219/490, 491, 506, 432, 433, 494; 177/DIG. 5, 185; 374/14; 436/21, 20; 73/76; 426/237, 520

[56] References Cited

U.S. PATENT DOCUMENTS

| | | | |
|---|---|---|---|
| 3,259,056 | 7/1966 | King | 99/325 |
| 3,741,328 | 6/1973 | Andersson et al. | 177/210 |
| 3,780,817 | 12/1973 | Videon | 177/136 |
| 3,813,918 | 6/1974 | Moe | 73/15 B |
| 3,819,112 | 6/1974 | Goodhouse | 235/61 A |
| 3,827,345 | 8/1974 | Wilson | 99/325 |
| 3,889,875 | 6/1975 | Goodhouse | 235/61 A |
| 3,890,825 | 6/1975 | Davis | 73/15 B |
| 4,165,633 | 8/1979 | Raisanen | 73/76 |
| 4,299,115 | 11/1981 | Athey et al. | 219/10.55 R |
| 4,334,955 | 6/1982 | Zoeke et al. | 219/518 |

FOREIGN PATENT DOCUMENTS 1508313  4/1978  United Kingdom ............... 219/518

Primary Examiner—M. H. Paschall
Attorney, Agent, or Firm—H. Neil Houser; Radford M. Reams

[57] ABSTRACT

Method and apparatus for detecting the boiling point of liquids being heated by a cooking appliance and automatically reducing the output power of the heat source, once the boiling point has been reached, to a level which will sustain a desired evaporation rate, by measuring the initial weight of the liquid to be heated; energizing the heat source at a predetermined power level, periodically measuring the weight of the liquid as the heating process continues; computing the rate of change of the weight of the liquid, and reducing the power level of the heat source to a lower power level when the computed rate of change exceeds a reference rate and increasing the power level when the computed rate of change is less than the reference rate once the boiling point has been reached. The first occurrence of a measured weight decrease greater than the reference rate signifies that the boiling point of the liquid has been reached.

14 Claims, 10 Drawing Figures

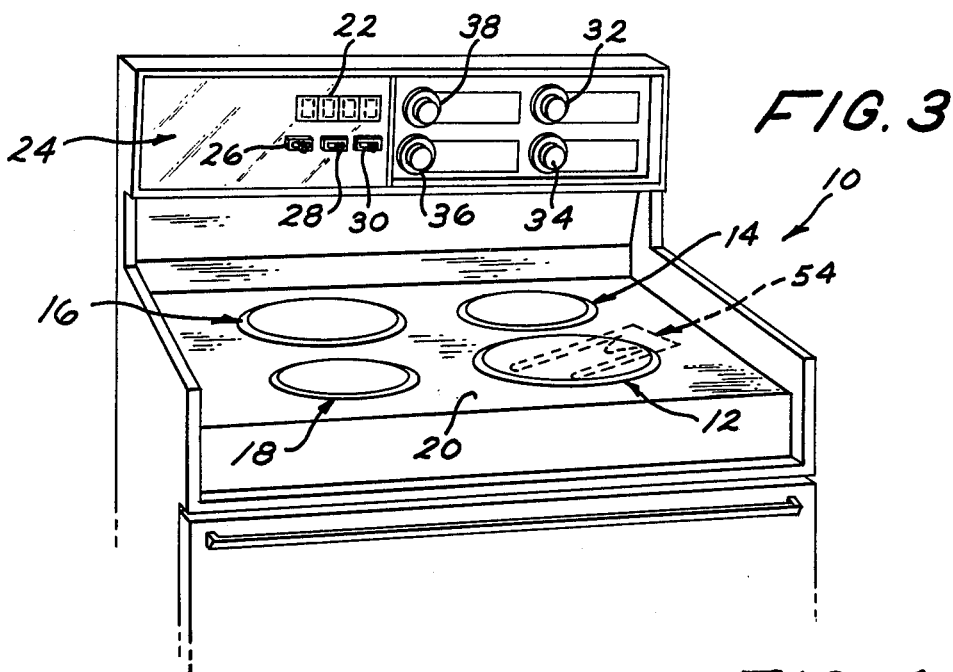
FIG. 3
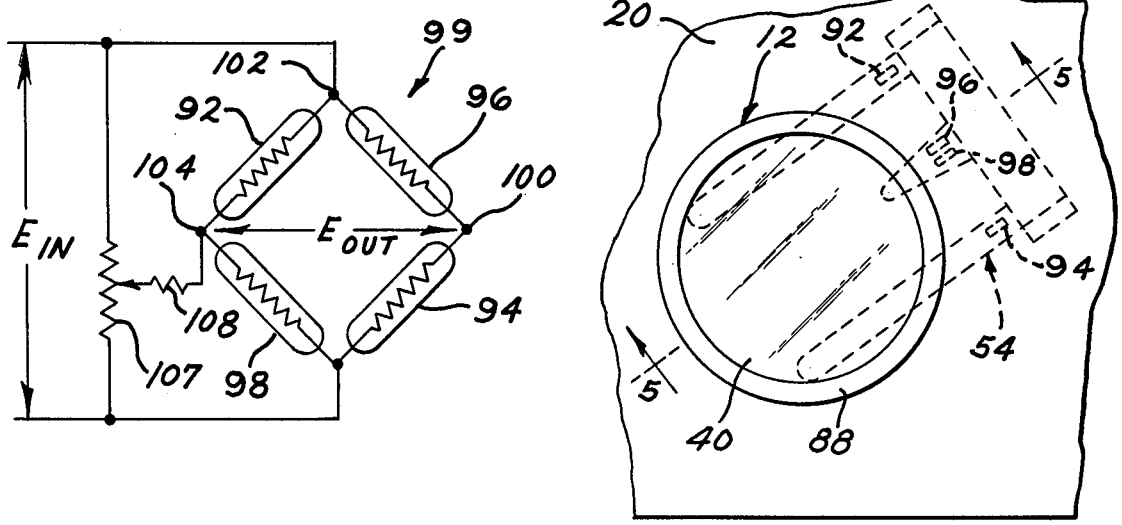
FIG. 8
FIG. 4
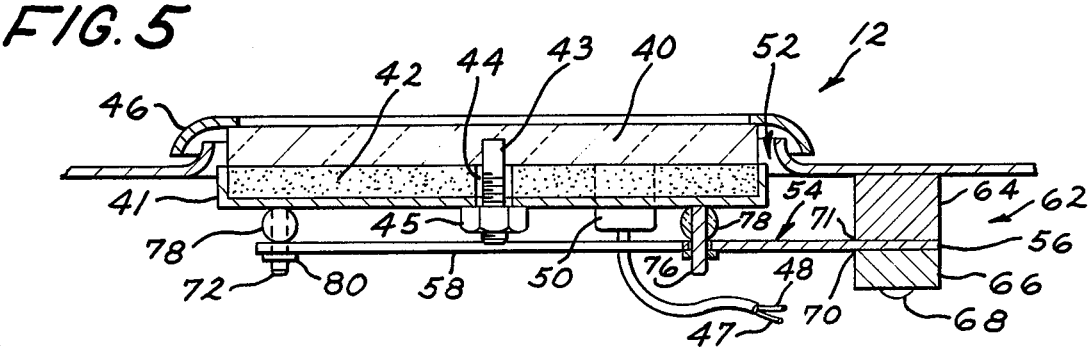
FIG. 5

METHOD AND APPARATUS FOR LIMITING THE EVAPORATION RATE OF LIQUIDS HEATED BY COOKING APPLIANCE SURFACE UNITS

CROSS-REFERENCE TO RELATED APPLICATION

This application relates to commonly-assigned, co-pending U.S. patent application Ser. No. 438,764 filed Nov. 3, 1982 by Peter H. Smith, entitled "Weight Measuring Arrangement for Cooking Appliance Surface Unit."

BACKGROUND OF THE Ing process. More specifically, the present invention relates to methods and apparatus for detecting that the temperature of liquids being heated by cooking appliances have reached their boiling point and for controlling the evaporation rate of such liquids to provide more efficient energy usage.

Cooking appliances such as hotplates and electric ranges typically have one or more surface unit heating elements for heating foods and liquids contained in utensils which are placed on the surface units. Frequently, such appliances are used to heat a liquid to its boiling point and possibly to maintain the liquid at that temperature for some period of time. Examples include boiling water for preparing tea, instant coffee and other hot beverages, as well as a step in food preparation such as boiling potatoes or cooking spaghetti or other pasta dishes. Typically, when faced with such a task, the user in an effort to bring the liquid to a boil as rapidly as possible will select the maximum power level for the heating element. This power setting selection generally accomplishes the intended result of bringing the liquid to boiling quickly. However, for most typical liquid loads, the energy delivered to the load, when the surface unit is operating at its maximum power setting, greatly exceeds that needed to maintain the liquid at the boiling temperature. This excess energy is absorbed as latent heat of vaporization, causing the liquid to boil violently with a high evaporation rate. In addition to being wasteful from an energy efficiency standpoint, continued operation of the surface unit at maximum power tends to boil the liquid away quickly, with the result that, if left unattended, the liquid may boil away completely, resulting in improperly cooked food and possibly damage to the utensil.

It is thus desirable to provide a power control arrangement which automatically adjusts the level of power applied to a heating unit downwardly once the liquid being heated reaches its boiling point to a power level sufficient to maintain the liquid at that temperature, but at a relatively minimal evaporation rate.

Additionally, when preparing foods which call for boiling the food for a particular period of time, typically the user must watch for the liquid as it is initially heated to visually detect when the boiling point has been reached to start the time period.

It is thus desirable to provide an arrangement for detecting when the liquid has begun to boil to provide a signal to the user that the boiling point has been reached. Such information could also be used to automatically begin the timing period for foods to be boiled for a predetermined time period.

It is therefore an object of the present invention to provide a method and apparatus applicable to a cooking appliance for controlling the power output of the appliance heater as a function of the weight of the food load being heated.

It is another object of this invention to provide a method and apparatus applicable to a cooking appliance which provides for repetitive measurement of the weight of the contents of a utensil being heated and controls the output power of the heater in accordance with the relationship of the rate of change of the measured weight to a reference rate.

It is another object of the present invention to provide a method and apparatus applicable to cooking appliances which detects that the boiling point of the liquid being heated has been reached and automatically reduces the power level of the heat source of the appliance when used to boil a liquid when the boiling point for the liquid has been reached, to the lowest power level which will sustain a desired evaporation rate.

It is another object of this invention to provide a method and apparatus applicable to a cooking appliance which automatically limits the evaporation rate of liquids boiled by the appliance to a desired rate by reducing the output power of the appliance heater when the rate of change of the measured weight signifies a rate of decrease or evaporation rate greater than the desired reference rate and which signals the detection of the first occurrence of such a decrease signifying that boiling of the liquid has begun.

SUMMARY OF THE INVENTION

According to one form of the invention, a cooking appliance is equipped to automatically detect that a liquid being heated by the heating means of the cooking appliance has reached its boiling point and to thereafter control the evaporation rate of the liquid. In accordance with the method of the present invention, evaporation rate control is achieved by measuring the initial weight of the liquid to be heated; energizing the heating means at a predetermined power level or setting, for example, its maximum or full power level; periodically measuring the weight of the liquid as the heating process continues, computing the rate of change of the weight of the liquid, and reducing the power level to a lower power level such as, for example, that associated with the next lower power setting, when the computed rate of change exceeds a predetermined reference value.

The method may, in accordance with one aspect of the invention, carry out the additional step of increasing the power level to a higher level such as, for example, that level associated with the next higher power setting when the computed rate of change of weight does not exceed the predetermined reference value.

Apparatus for carrying out the above described method in accordance with the present invention for a cooking appliance includes at least one platform for supporting a utensil containing food items to be heated, selectively energizable heating means for heating the food items contained in the utensil, and a control system for controlling operation of the appliance. The control system includes means for continuously sensing the weight of food items supported by the platform during the heating period and generating a weight signal representative of the then existent food weight, and control means including means for periodically sampling the weight signal and generating a rate signal representative of the rate of change of the weight of the food items; reference means for providing a reference signal representative of a desired rate of change of the food weight;

comparing means for comparing the detected rate of change and the desired rate of change; and power control means for varying the output power of the heating means in accordance with the comparison result.

In accordance with another aspect of the invention, the control means further comprises means for signalling the user that the liquid being heated is boiling upon the initial detection of a rate of decrease greater than the reference rate.

The method and apparatus of the invention is believed to be of particularly advantageous use in an electric range cooktop or hotplate to control the output power of a surface heating unit which is adapted to function both as a heating unit and a scale platform.

BRIEF DESCRIPTION OF THE DRAWINGS

FIG. 3 is a perspective view of a portion of an electric range illustratively embodying the present invention;

FIG. 4 is a fragmentary top view of the range of FIG. 3 illustrating a single one of the surface unit heating elements supported in accordance with the present invention;

FIG. 5 is a cross-sectional elevational view of the heating element taken along lines 5—5 of FIG. 4;

FIG. 8 is a simplified schematic circuit diagram of the bridge network incorporating the strain gages carried on the cantilever member of FIG. 6;

DETAILED DESCRIPTION OF THE INVENTION

The present invention provides a novel method and apparatus for controlling the power output of an electric heat source such as is typically employed in a range, hotplate, microwave oven or similar cooking appliance, which is particularly advantageous when the heat source is being used to bring a liquid to a boil quickly and maintain it at the boiling point for some period of time, and apparatus for carrying out the method. While the cooking appliance to be described herein as illustratively embodying the method and apparatus of the present invention is an electric range having at least one electric surface heating unit arranged to function both as a heating unit and as a scale platform, it will be apparent that the method and apparatus could be similarly employed in other types of cooking appliances such as microwave ovens, provided that such appliances are equipped with a means for periodically weighing the liquid during the heating process, and means for selectively energizing the heat source of the appliance at a plurality of power levels.

When liquids are heated, the weight of the liquid remains relatively constant until the boiling point is reached. Thereafter, evaporation occurs at an accelerated rate relative to that occurring at lower temperatures. If energy delivered to the liquid load from the heat source exceeds that necessary to maintain the boiling point temperature, the excess energy is absorbed as latent heat of vaporization which may substantially increase the evaporation rate. Typically, an electric surface unit when operated at full power will maintain a needlessly high and energy inefficient evaporation rate in most liquid heating situations. For example, 2 pounds of water when heated by a 2 kilowatt rated heating unit will be heated from room temperature to its boiling point (212° F.) in approximately 3 minutes. Thereafter, if the f the present invention, the weight of the liquid to be heated is periodically determined while the liquid is being heated. Whenever a comparison of the present measured weight with the previous measured weight indicates that the weight of the liquid is decreasing at a rate greater than a predetermined desired rate, the power level at which the heat source is operating is reduced by a predetermined increment.

Figure 1:
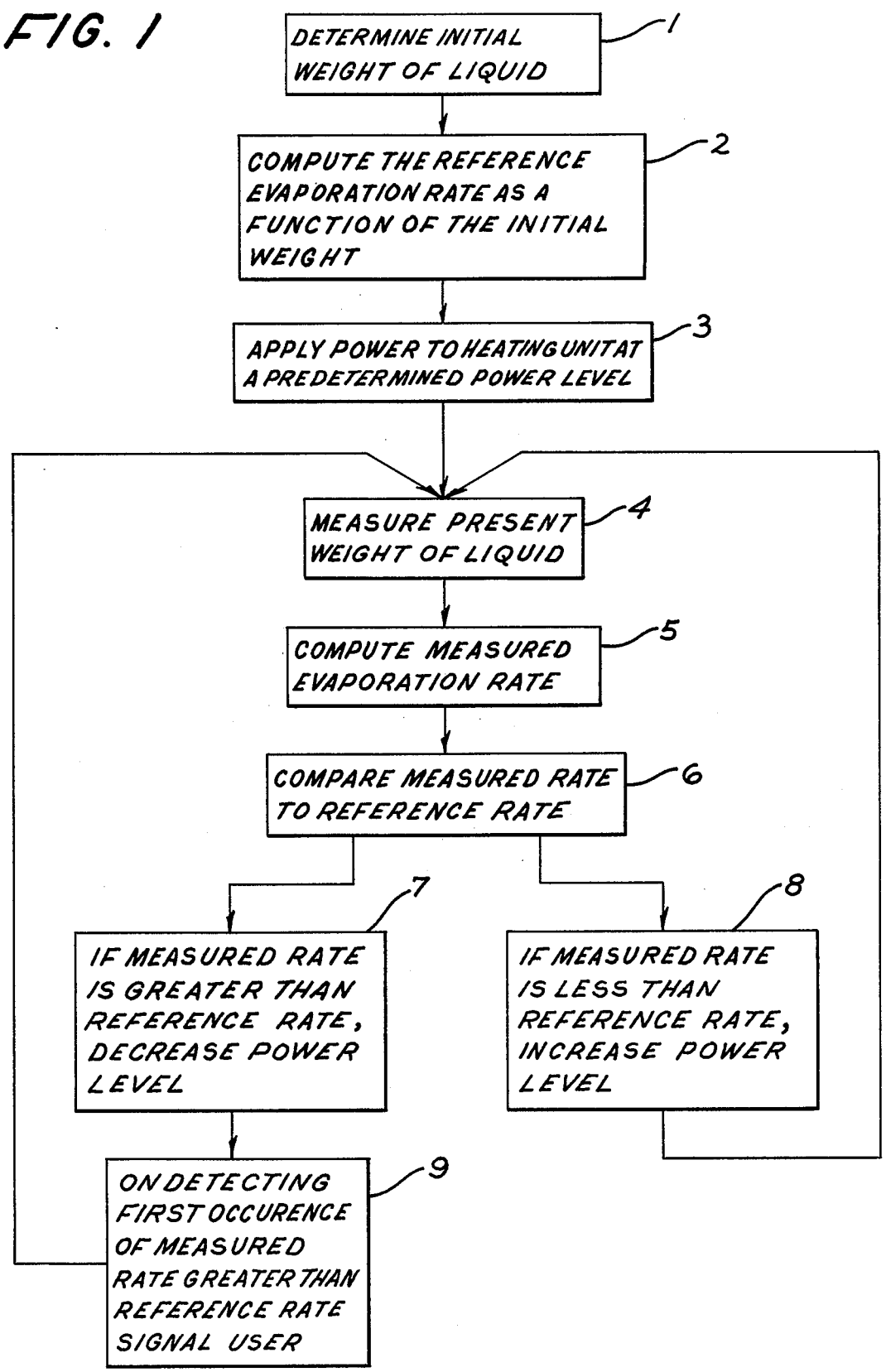
FIG. 1 is a flow diagram illustratively describing the steps of the power control method of the invention.

A more specific form of the method of the present invention is illustrated in the flow diagram of FIG. 1. The first step (Block 1) is the determination of the initial weight of the liquid, or possibly liquid and food combined, prior to reaching the boiling point of the liquid. Next, a reference evaporation rate is determined as a function of the initial weight (Block 2). In the illustrative embodiment, the reference evaporation rate is chosen to be a fixed percentage of the initial weight, namely 12 percent of the initial weight per hour. For a measurement interval of thirty seconds, this reference rate is 0.10 percent per measurement interval. For example, the reference rate for a combined food and liquid weight of 2 lbs. would be 0.002 lbs. per thirty second measurement interval. The final initialization step is the application of power to the heat source at a predetermined level (Block 3), preferably a level which will bring the liquid to its boiling temperature rapidly, such as the maximum or full power level.

Having completed the initial steps which are only performed once for a given load to be heated, a sequence of iterative steps is initiated by measuring the present weight of the food load (Block 4). This weight measurement is then used together with the next preceding weight measurement to compute the rate of change of the weight (Block 5), which substantially equals the evaporation rate. This measured rate is compared to the reference rate (Block 6) determined in step 2 (Block 2). If the measured rate exceeds the reference rate, this indicates that the surface unit is operating at a higher than necessary power level, and the power level is reduced to a lower power level which may be a decrease of a predetermined incremental amount such as, for example, 10 percent of the maximum power (Block 7). If the present evaporation rate is less than the reference rate, signifying that the power level is not sufficient to maintain the desired reference evaporation rate, the power is increased to a higher level which may be a predetermined incremental increase such as, for example, 10 percent of the maximum power (Block 8), unless of course it is already operating at the maximum power level. The steps identified in Blocks 4 through 8 are then repeated at predetermined measurement intervals for the balance of the heating period. The initial detection of an evaporation rate greater than the reference rate signifies that boiling of the liquid has begun. This information can be used to initiate other steps such as providing a signal to the user that boiling has begun (Block 9).

After detecting the initial decrease signifying boiling has begun, the measurement interval between each iteration of the steps of Blocks 4–8 in FIG. 1 should be long enough to allow a steady state condition to be reached for the new power level when a change of level occurs. At the other extreme, the interval should be short enough to reduce the power level to the minimum level necessary to sustain the desired evaporation rate relatively rapidly. A measurement interval between weight measurements on the order of 30 seconds is considered satisfactory for most liquid and combined liquid and food loads heated on surface units in the home. A shorter measurement interval may be appropriate for appliances such as microwave ovens which typically bring liquids to their boiling point more rapidly. It will be appreciated that boiling may begin near the end of one measurement interval such that it would not be detected until the end of the next measurement interval. In order to more accurately detect when boiling begins, a shorter measurement interval may be implemented until the first substantial decrease is detected.

Figure 2:
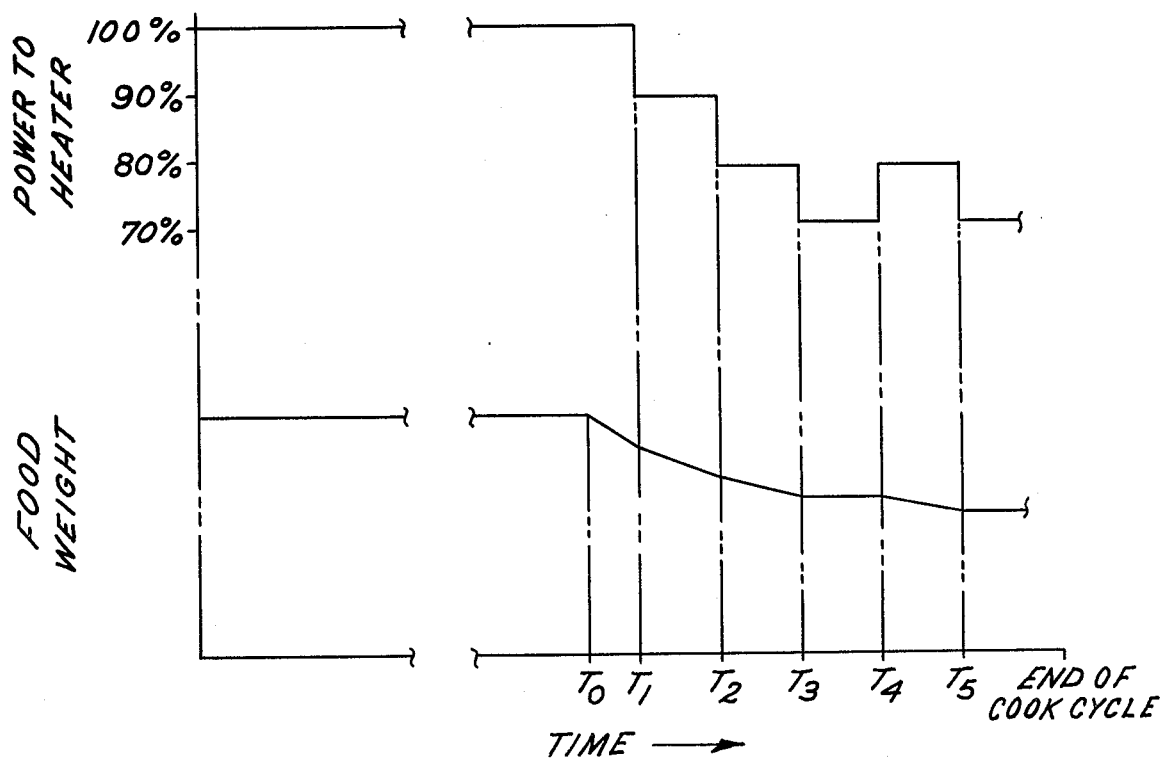
FIG. 2 is a graph qualitatively showing heating unit output power and weight of food being heated as a function of time when heated in accordance with the method of FIG. 1.

The graph of FIG. 2 showing both the power level applied to the heat source and the weight of the load being heated as a function of time qualitatively illustrates the method of FIG. 1. Initially, the heat source is energized at 100 percent power. The weight of the liquid remains essentially constant as the temperature rises to the boiling point. The first detection of a rate of change greater than the desired rate occurs at $T_1$, at which time the power level is reduced by 10 percent. The next measurement at $T_2$ indicates that the rate is still greater than the desired rate and the power is reduced to 80 percent of full power. This is repeated at $T_3$ with the power now reduced to 70 percent. Finally, at $T_4$ a rate of change less than the desired rate is detected, at which time the power is increased to 80 percent. This results in a rate exceeding the desired rate being detected at the $T_5$ and the power is again reduced to 70 percent. Oscillating between these two levels may continue thereafter until the heating cycle is terminated by the user.

Referring now to FIG. 3, the invention will be described as embodied in an electric range 10 which includes four conventional solid plate electrical surface heating units 12, 14, 16 and 18. Surface units 14, 16 and 18 are supported in openings in cooktop 20 in a conventional manner. Surface unit 12, however, is constructed and arranged to function as both a heating element and as a scale platform. Such a surface unit arrangement is described in greater detail in co-pending, commonly-assigned U.S. patent application Ser. No. 438,764 filed Nov. 3, 1982 by Peter H. Smith, entitled "Weight Measuring Arrangement for Cooking Appliance Surface Unit," the disclosure of which is hereby incorporated by reference.

While in the illustrative embodiment the weight measuring arrangement is employed with only one of the heating elements, it will of course be understood that the remaining heating elements could be similarly arranged. Similarly, while the surface unit of the illustrative embodiment employs a solid plate surface unit, it will be recognized by those skilled in the art that the present invention is applicable to other types of surface unit assemblies as well, including, by way of example but not limited to, conventional sheathed resistive heating elements and also induction surface units.

The digital display 22 on control panel 24 may be used for displaying weight information derived from the weight measuring surface unit arrangement. Option selection switches designated 26, 28 and 30 enable the user to select from a tare option, a weight option, and an AUTO BOIL option for the cooktop surface unit 12, the latter being a power control option, respectively. Control knobs 32, 34, 36 and 38 disposed on control panel 24 enables the user to select the desired power level for each surface unit 12, 14, 16 and 18, respectively when the surface units are to be operated in the conventional manner.

Figure 6:
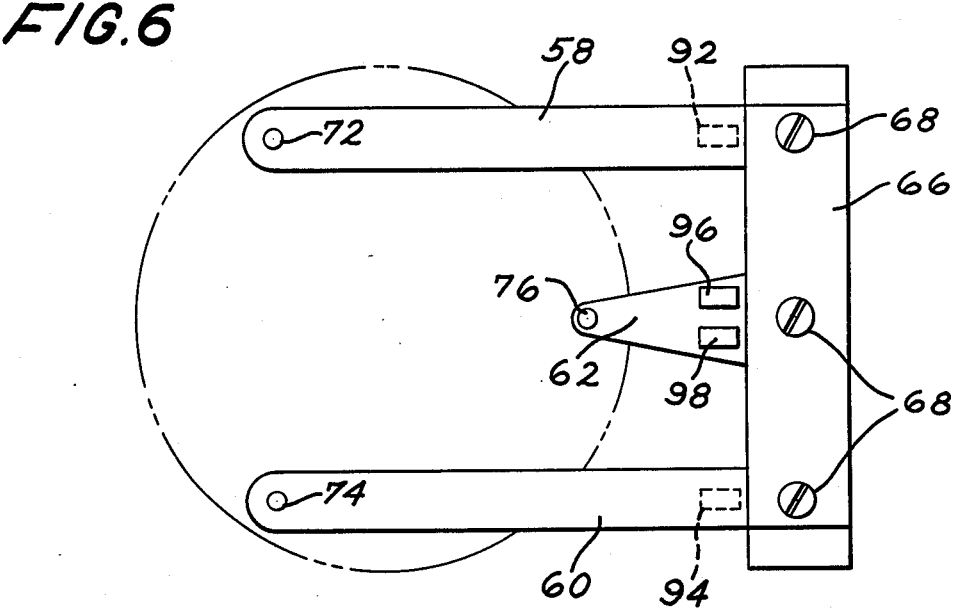
FIG. 6 is a bottom plan view of the three-arm cantilever member which supports the heating element of FIG. 4.

Referring now to FIGS. 4, 5 and 6, surface unit 12 comprises a standard solid heater plate assembly 40. Since the details of the basic structure of heating unit assembly 40 are not critical to the invention, the solid heater plate assembly 40 is shown in simplified schematic form in the accompanying figures. Heater plate assembly 40 is carried on a circular metallic pan 41 filled with an alumina insulating material 42. A central assembly stud 43 projects downwardly from solid heater plate 40 through an aligned opening 44 in the central opening in reflector pan 41. During assembly, nut 45 is threaded on stud 43 to secure pan 41 and heating element 40 together. An appearance trim ring 46 is carried at its inner edge to the outer edge of the solid plate heater 40. Power is supplied to heater assembly 40 via insulated wire conductors 47 and 48 coupled to connector terminal 50. The exact configuration of the heating plate is not important provided that it is adapted such that the entire assembly is supported at three support points with the weight of the assembly and loads placed thereon substantially equally distributed among the three points. Solid plate heater assembly 40 can be a commercially available assembly such as that manufactured by E.G.O., a West German manufacturer. The solid plate heater assembly is attractive for such applications because of its relatively low profile and its solid heater plate. However, other standard surface heating units including induction units and the helical sheathed resistance type heating elements could be similarly used.

Surface unit 12 is supported in opening 52 of cooktop 20 by a three-armed cantilever beam member 54 to provide a three point support system for a controlled center of mass for the typically circular type loads presented by cooking utensils. Beam member 54 comprises a support base or strip portion 56, and a set of three cantilever support arms, two substantially identical outer arms 58 and 60 and a relatively short inner arm 62, all three arms projecting laterally from base portion 56. Beam member 54 is suitably secured to a fulcrum support block 62.

Support block 62 comprises two sections, an upper section 64 which is suitably secured to cooktop 20, such as by welding, and a lower section 66. Support strip 56 is tightly sandwiched between the upper and lower sections 64 and 66 with lower section 66 being secured to upper section 64, such as by screws 68, to tightly grip support strip 56 therebetween. Edge 70 of lower section 66 defines the fulcrum point for each of the cantilever arms. Section 66 must be of sufficient thickness to provide a mechanically stable fulcrum point.

Support strip 56 is secured by block 62 to cooktop 20 adjacent opening 52, such that arms 58, 60 and 62 extend beneath the opening to support heating unit 12 in the opening. A set of three metal posts 72, 74 and 76 are secured to the bottom face of pan 42 by suitable means such as by welding, one post projecting downwardly from reflector pan 42 at each of the three support points. The length of each of arms 58, 60 and 62 of cantilever member 54 is selected such that when in position on the cooktop each arm extends beneath a corresponding surface unit support point, with holes 58a, 60a and 62a formed in arms 58, 60 and 62, respectively, receiving the associated posts 72, 74 and 76, respectively. Spherical support balls 78 of a thermally insulating, ceramic material are carried on the posts 72, 74 and 76 sandwiched between the associated cantilever arm and the reflector pan 42. A retainer clip 80 is secured to each post to secure the support posts in position.

The three arms 58, 60 and 62 of cantilever beam member 54 are each constructed and arranged to flex or deflect when a weight, such as a cooking utensil, is placed on surface unit 12 by an amount proportional to that weight. In order to provide level support for loads placed on the surface unit, all three arms must deflect an equal vertical distance in response to equal weight supported therefrom. In addition, each arm is configured such that for equal vertical deflections the strain characteristic exhibited by outer arms 58 and 60 are substantially identical and the strain characteristic exhibited by inner arm 62 is substantially one-half that exhibited by each of the outer arms, in order to facilitate the use of a balance Wheatstone bridge strain gage arrangement.

Strain gages 92, 94, 96 and 98 are used to sense the flexing of support arms 58, 60 and 62. The three arm support arrangement is made compatible with the four arm bridge network by using one gage each with two of the support arms and two gages with the remaining arm. Specifically, gages 92 and 94 are secured to the upper surface of arms 58 and 60, respectively, proximate edge 71 of mounting block 64. Gages 96 and 98 are arranged side by side on arm 62 on the opposite surface of member 54 proximate edge 70 of block 66.

FIG. 8 shows strain gages 92, 94, 96 and 98 electrically connected in a Wheatstone bridge network 99 with one gage in each of the four branches of the bridge. Gages 92 and 94, comprising one set of gages, sense the strain of outer arms 58 and 60, respectively, and gages 96 and 98, comprising the other set of gages, sense the strain of inner arm 62. The gages in each set are connected at opposite branches of the bridge network such that the output signal from the bridge taken from terminals 100 and 104 is proportional to the sum of the strain sensed by each of the individual gages, which in turn is proportional to the combined weight. However, this combined weight includes the weight of the heating unit assembly itself, in addition to whatever load is placed on the surface unit. It is desirable to balance the bridge network at the time of circuit assembly such that the output voltage is zero when only the surface unit is supported by beam member 54. Adjustable resistor 107 and resistor 108 enable the calibration of bridge network 99 during appliance assembly to null out the voltage differential resulting from the weight of the surface unit supported by cantilever support member 54. By appropriately adjustiorm loads, equally distributed among the three support points, the deflection of each arm is porportional to one-third of the total weight. Thus, the change in resistance of each of the strain gages 92 and 94 mounted to the outer arms 58 and 60 is intended to be proportional to one-third of the total weight. However, the total change in resistance of the two resistances secured to the inner arm 62 must be proportional to one-third of the total weight. Thus, the change in resistance of each must be proportional to one-sixth of the total weight. Consequently, the structure of cantilever beam member 54 is constructed and arranged such that the two outer arms 58 and 60 each exhibit substantially identical strain characteristic as measured by gages 92 and 94, and the third arm 62 exhibits one-half of the strain of the outer arms as measured by gages 96 and 98 when all three arms are deflected equally by the combined weight of the utensil, heating unit and food in the utensil supported from cantilever beam member 54.

In the illustrative embodiment, cantilever member 54 is fabricated from a piece of sheet metal such that the entire member is of comparable elastic modulus. The length of each of the arms is dictated by the location of the support points to provide the controlled center of gravity. Thus, to achieve the desired strain characteristic for the inner arm 62, a tapered beam configuration is employed with the thickness of the arm, the width of the arm at the fulcrum point and the width at the support point being determined by applying a regression technique to well known structural mechanics relationships for a tapered cantilevered beam. In the illustrative embodiment, the cantilever beam member has a substantially uniform thickness, of 0.1875 inches, except for inner beam 62. The outer arms are 7 inches in length and 1.0 inch in width. The inner arm has a thickness of 0.097 inches, a width at the fulcrum point (edge 70) of 1.45 inches, a length of 2.5 inches from the fulcrum point to the support point (post 76), and a width at the support point of 0.5 inches. Deflection for all three arms is to be on the order of 0.08 inches for a load of 12 pounds. The modulus of elasticity of the beam material is approximately $1.06 \times 10^6$ pounds per square inch. The strain gages 92, 94, 96 and 98 are each located approximately 0.6 inches from edge 70.

Figure 9:
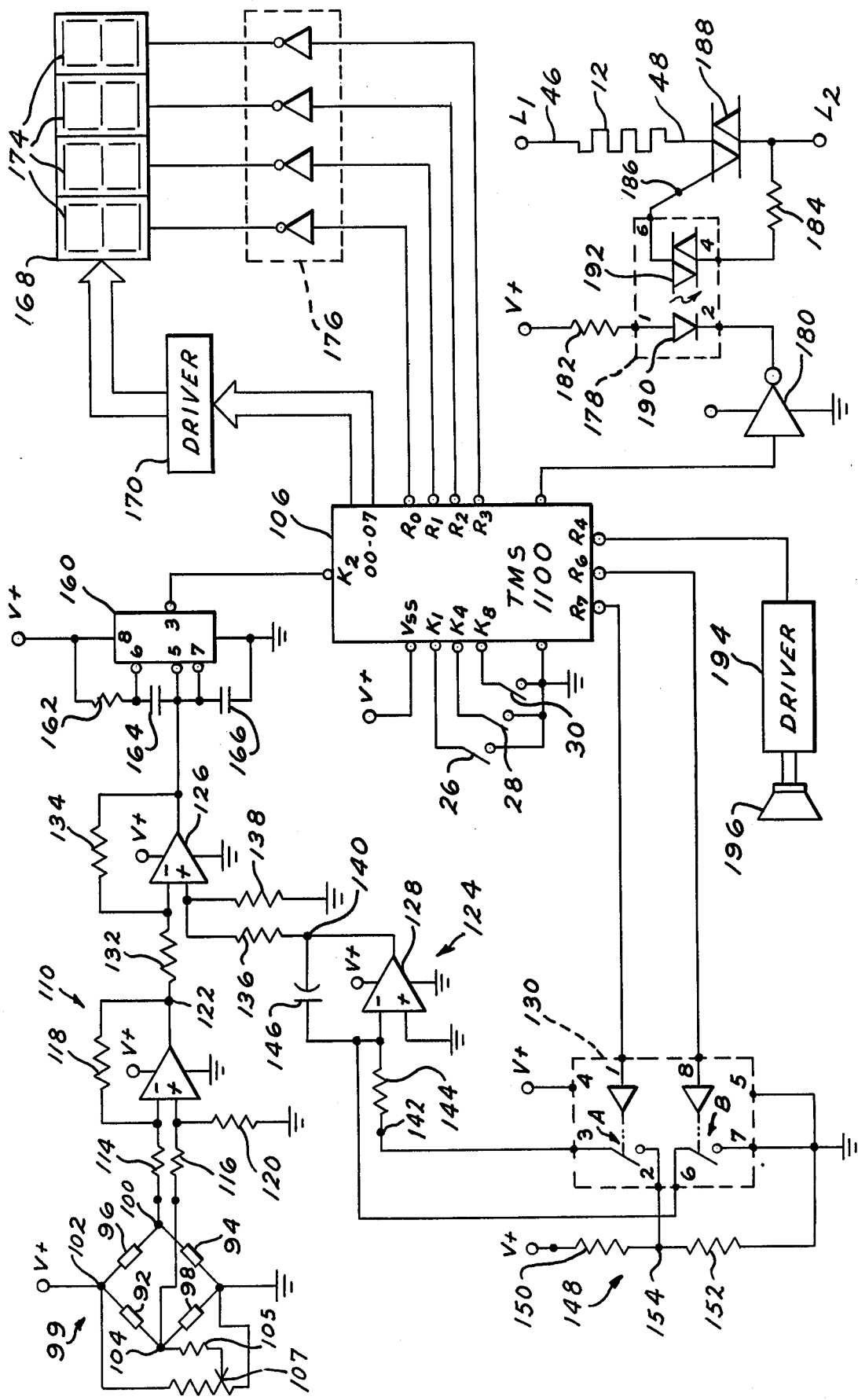
FIG. 9 is a simplified schematic circuit diagram of a power control circuit for the heating element of FIG. 4 incorporating the bridge network of FIG. 8.

Referring now to FIG. 9, bridge network 99 incorporated in a microprocessor based control circuit arrangement which illustratively embodies the method and apparatus of the invention.

The weight sensing means in the circuit of FIG. 9 essentially comprises the bridge network 99, amplifying circuit 110 which amplifies the bridge output, tare circuit 124 which tares out the utensil weight, and voltage controlled oscillator 160 which converts the analog voltage signal to a frequency for input to the control means, microprocessor 106.

Bridge network 99 is energized by a regulated dc voltage supply V+ of 15 volts. As herein before described, the voltage signal derived across terminals 100 and 104 is proportional to the weight supported by cantilever member 54, calibrated by proper adjustment of the resistor 107 to null out the weight of the surface unit.

The output signal across terminals 100 and 104 is applied to a amplifying circuit designated generally 110 which comprises an operational amplifier 112 connected in a conventional difference amplifier configuration. Resistors 114 and 116 couple the terminals 100 and 104 to the inverting (−) and non-inverting (+) inputs, respectively, of amplifier 112. Feedback resistor 118 connects the output of amplifier 112 to its inverting input. Resistor 120 couples the non-inverting input to system ground. In this arrangement, the gain of the differential circuit is determined by the ratio of feedback resistor 118 to resistor 114. Resistors 116 and 120 are matched to resistors 114 and 118, respectively, for satisfactory common mode rejection. The voltage differential from bridge network 99 applied to the inputs of amplifer 112 is in the range of 0-10 millivolts for weights from 0 to 15 lbs. The ratio of resistor 118 to resistor 114 is chosen to provide a gain of 50, resulting in an amplifier output signal at terminal 122 in the range of 0-5 volts The output of amplifier 112 is applied to a tare circuit, designated generally 124, comprising essentially operational amplifiers 126 and 128 and analog switch 130. The function of tare circuit 124 is to raise the voltage applied to the non-inverting input of amplifier 126 to a tare level sufficient to null out the utensil weight voltage applied to the inverting input of amplifier 126 representing an empty utensil placed on surface unit 12 and hold the non-inverting input voltage at that tare level when the empty utensil is filled with a food load to be measured to enable a net weight measurement. Amplifier 126 is connected in a conventional difference amplifier configuration. The voltage signal from terminal 122 is coupled to the inverting input of amplifier 126 by resistor 132. Feedback resistor 134 is coupled between the output of amplifier 126 and its inverting input. A tare voltage signal from amplifier 128 is coupled to the non-inverting input of amplifier 126 by resistor 136. Resistor 138 couples the non-inverting input of amplifier 126 to system ground. Resistors 132, 134, 136 and 138 are of equal resistance to provide a unity gain differential amplifier configuration. The output of amplifier 126 represents the difference between the weight signal at terminal 122 and the tare signal at terminal 140, the output of amplifier 128. It will be apparent that if, while the tare signal representing the weight of the empty utensil is held at terminal 140, the empty utensil is filled with the food load to be weighed, the weight signal at terminal 122 then represents the gross weight of the utensil and food load, and the output of amplifier 128 then represents the difference between the gross weight of the loaded utensil and the tare weight of the utensil, i.e., the net weight of the contents of the utensil.

The tare signal is generated by operational amplifier 128 which is connected in a conventional integrator configuration. The output signal at terminal 140 is substantially proportional to the integral over time of the input signal at terminal 142 which is coupled to the inverting input of amplifier 128 by resistor 144. Capacitor 146 couples the output of amplifier 128 to its inverting input. Capacitor 146 and resistor 144 determine the proportionately constant between the input voltage at terminal 142 and the output voltage at terminal 140.

When a tare is desired, a dc voltage is applied to the inverting input of amplifier 128 and maintained at that input until the output voltage at 140 reaches the desired level, at which time the input voltage signal is removed, and the output voltage holds at that level. In the embodiment of FIG. 9, the dc voltage is derived from voltage divider 148 comprising resistors 150 and 152, which is energized by the V+15 volt regulated voltage supply. Terminal 154 of voltage divider 148 is coupled to input terminal 142 of amplifier 128 by internal switch A of analog switch 130. Switch A functions as a normally open switch internally coupling pin 2 and pin 3 of switch 130. The state of internal switch A is controlled by an actuating signal applied to pin 1. When switch A is closed, the voltage at terminal 154 is applied to terminal 142. Thus, to initiate a tare determination, microprocessor 106 outputs an actuating signal at output port R7, which is connected to pin 1 of switch 130, and monitors the frequency at input port K2. This closes switch A, causing the voltage at terminal 140 to rise. When the voltage at terminal 140 rises to the null level, that is the level which nulls the utensil weight, the frequency at K2 signifies a zero weight. The microprocessor, upon detecting the zero weight input frequency, removes the actuating signal from port R7, thereby opening switch A. There being no closed discharge path for capacitor 146, the voltage at terminal 140 is effectively held at this tare level.

The tare circuit is reset by closure of internal switch B of switch 130 which is a normally open switch coupling pin 6 to pin 7. Switch B couples capacitor 146 to system ground. Thus, when switch B is closed by a reset signal at pin 8, capacitor 146 is rapidly discharged and the tare circuit is then reset. Microprocessor 106 resets the tare circuit by generating a reset signal at output port R6 which is connected to pin 8 of switch 130. Switch 130 in this embodiment is a quad SPST JFET analog switch device commercially available as an integrated circuit from National Semiconductor, identified by the Order Number LF 11331.

Figure 7:
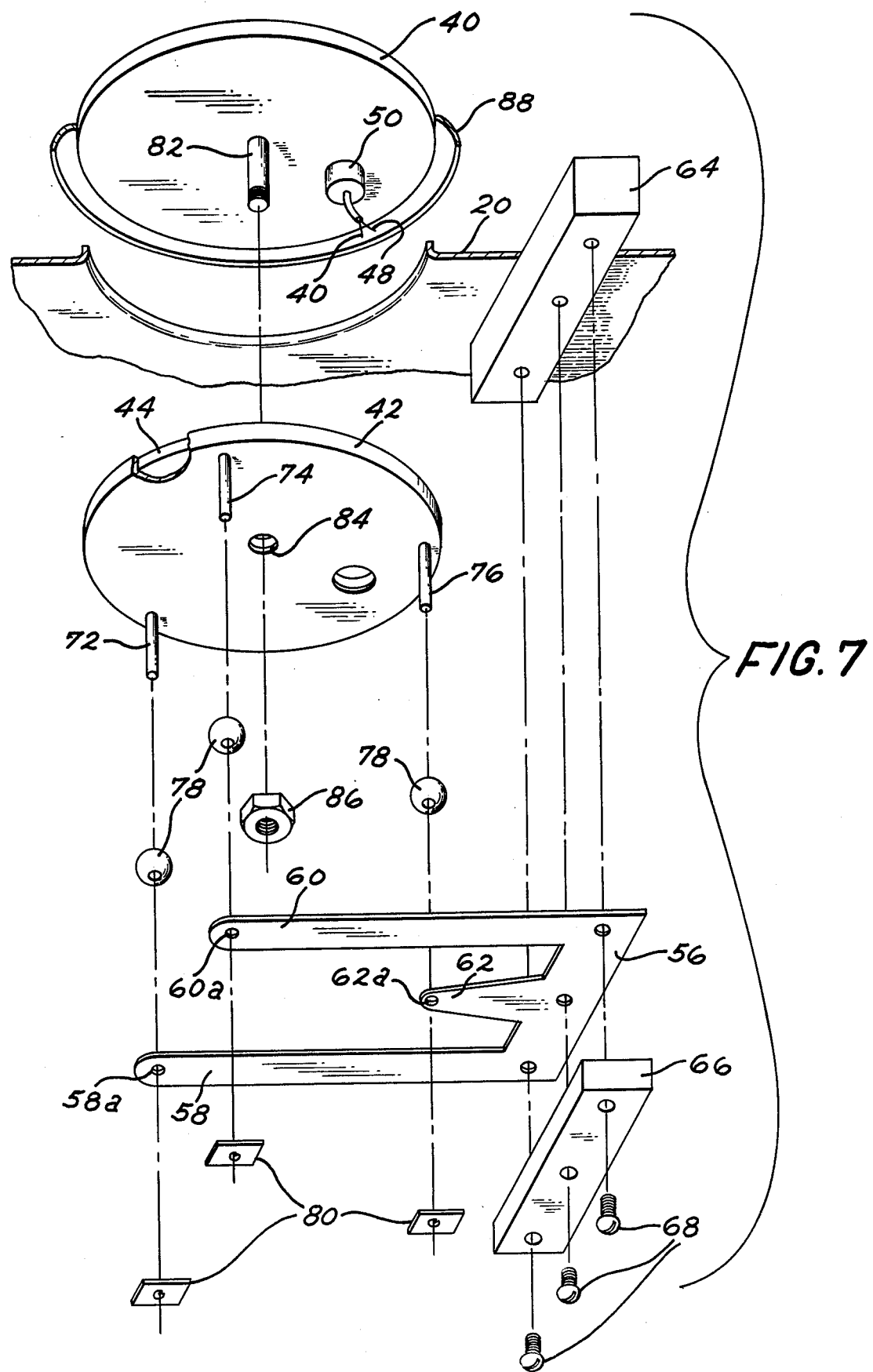
FIG. 7 is an exploded perspective view of the heating element of FIG. 4 together with its weight measuring support structure.

Weight information derived from bridge network 99 and processed by circuits 110 and 124 remains in analog form at the output of amplifier 126. The voltage signal is converted to a frequency which varies as a function of the voltage level for input to microprocessor 106 by voltage controlled oscillator (VCO) 160 which generates an output signal in the form of a square wave having a frequency which is linearly proportional to its input voltage. In the illustrative circuit of FIG. 7, VCO 160 is an integrated circuit commonly referred to as a 566 VCO, commercially available from many manufacturers. The IC used in FIG. 6 is available from National Semiconductor by the ID Number LM566.

The output signal from amplifier 126 is connected to modulation input pin 5 of VCO 160. A regulated dc supply voltage V+ is applied to pin 8 of VCO 160. Timing resistor 162 couples the supply voltage to pin 6. Capacitor 164 is connected between pins 5 and 6 to prevent parasitic oscillations that may occur during VCO switching. Timing capacitor 166 is connected between pin 7 and system ground. Pin 1 is coupled directly to system ground. The square wave output signal is provided at pin 3.

This output signal at pin 3 will have a frequency which is linearly proportional to the voltage applied to pin 5 which in turn is linearly proportional to the weight as sensed by bridge network 99. This square wave signal is applied to input port K2 of microprocessor 106. In the illustrative embodiment, circuit parameters are selected to provide a frequency range of 1 KHz to 5 KHz for the input voltage range of 0-5 volts.

Control means including rate detecting means which periodically samples the weight signal at K2 to determine the rate of change of the sensed weight; reference means which provides a signal representing the desired rate of change of the weight; comparing means which compares the detected rate of change and the reference rate; and power control means which varies the output power of the heating means in accordance with the relationship between the detected rate and the reference rate are provided in the form of an appropriately programmed microprocessor 106.

Microprocessor 106 in the illustrative embodiment of FIG. 9 is a TMS 1100 microprocessor readily commercially available as a single chip integrated circuit from Texas Instruments. Microprocessor 106 has been customized by permanently configuring its read only memory (ROM) to process the input signal at K2, to display weight information derived from the signal at K2 to the user and to use that weight information to carry out a power control method to be described in greater detail hereinafter.

A conventional 4-digit seven segment display 168 is employed in the circuit of FIG. 9 to display weight information derived from bridge network 99. Display data multiplexed with the decoded seven segment data is provided at output ports 00-07 of microprocessor 106 and coupled to the display circuity 168 via conventional segment driver circuitry designated 170. The output signal for driving each of the four digits 174 is provided at output ports R0-R3 of microprocessor 106, which are coupled to the display via conventional driver circuitry 176. The multiplexing of the multi-digit display data may be performed by a microprocessor in any conventional manner well known in the art.

Microprocessor 106 controls the power applied to the heating means, surface unit heating element 12, by trigger signals provided at output port R8. This signal is coupled to pin 2 of an opto-isolator circuit 178 via inverting buffer amplifier 180. Pin 1 of opto-isolator 178 is coupled to a regulated supply voltage V+ via current limiting resistor 182. The output return pin 4 of opto-isolator 178 is coupled to power line L2 via current limiting resistor 184. Pin 6 is coupled to the gate terminal 186 of a triac switching device 188 which is connected in series with heating element 12. A trigger signal at R8 is amplified by amplifier 180 to forward bias light emitting diode 190 of switch 178, which in turn switches the bipolar switch portion 192 of switch 178 into conduction, thereby applying a gate signal to power control triac 188, switching it into conduction to energize heating element 12.

Microprocessor 106 is programmed to selectively energize surface unit 12 at a plurality of power levels by varying the frequency of the trigger signals at R8 to control the duty cycle of the heating element, a predetermined duty cycle being associated with each user selectable power setting selected by the user via control knobs 32 (FIG. 3). Any one of many well known techniques for controlling the power to the heating element may be used. In the illustrative embodiment, duty cycle control is designed to provide ten power levels ranging from 10 percent to 100 percent power in increments of 10 percent.

Output port R4 of microprocessor 106 is coupled by convenient driver circuitry 194 to a conventional buzzer or tone generating device 196. Buzzer 196 provides an audible signal to the appliance user when triggered by a trigger signal at port R4.

The following component values are believed suitable for use in the circuit shown in FIG. 9. These values are exemplary only, and are not intended to limit the scope of the claimed invention.

| Strain Gages 92, 94, 96, 98 | | Magnaflux PA-03-125AH-350 | |
|---|---|---|---|
| Fixed Resistors | | | |
| 108 | 100K ohms | 138 | 47K ohms |
| 114 | 330 ohms | 144 | 1M ohm |
| 116 | 330 ohms | 150 | 15K ohms |
| 118 | 16.5K ohms | 152 | 6.8K ohms |
| 120 | 16.5K ohms | 162 | 10K ohms |
| 132 | 47K ohms | 182 | 220 ohms |
| 134 | 47K ohms | 184 | 220 ohms |
| 136 | 47K ohms | | |
| Variable Resistors | | | |
| 106 | | 100K ohms | |
| Capacitors | | | |
| 146 | | 10 mfd. | |
| 164 | | .001 mfd. | |
| 166 | | .015 mfd. | |
| Operational Amplifier | | | |
| 112, 126, 128 | | National Semiconductor LM 308 Integrated Circuit | |
| 180 | | ULN 2004A Integrated Circuit | |
| Analog Switch | | | |
| 130 | | National Semiconductor LF 11331 Integrated Circuit | |
| Opto-Isolator | | | |
| 178 | | Integrated Circuit MDC 3020 | |
| Microprocessor | | | |
| 106 | | Texas Instruments Integrated Circuit TMS 1100 | |
| Voltage Controlled Oscillator | | | |
| 160 | | National Semiconductor Integrated Circuit LM 566 | |
| Triac | | | |
| 188 | | General Electric Company SC147 | |

Figure 10:
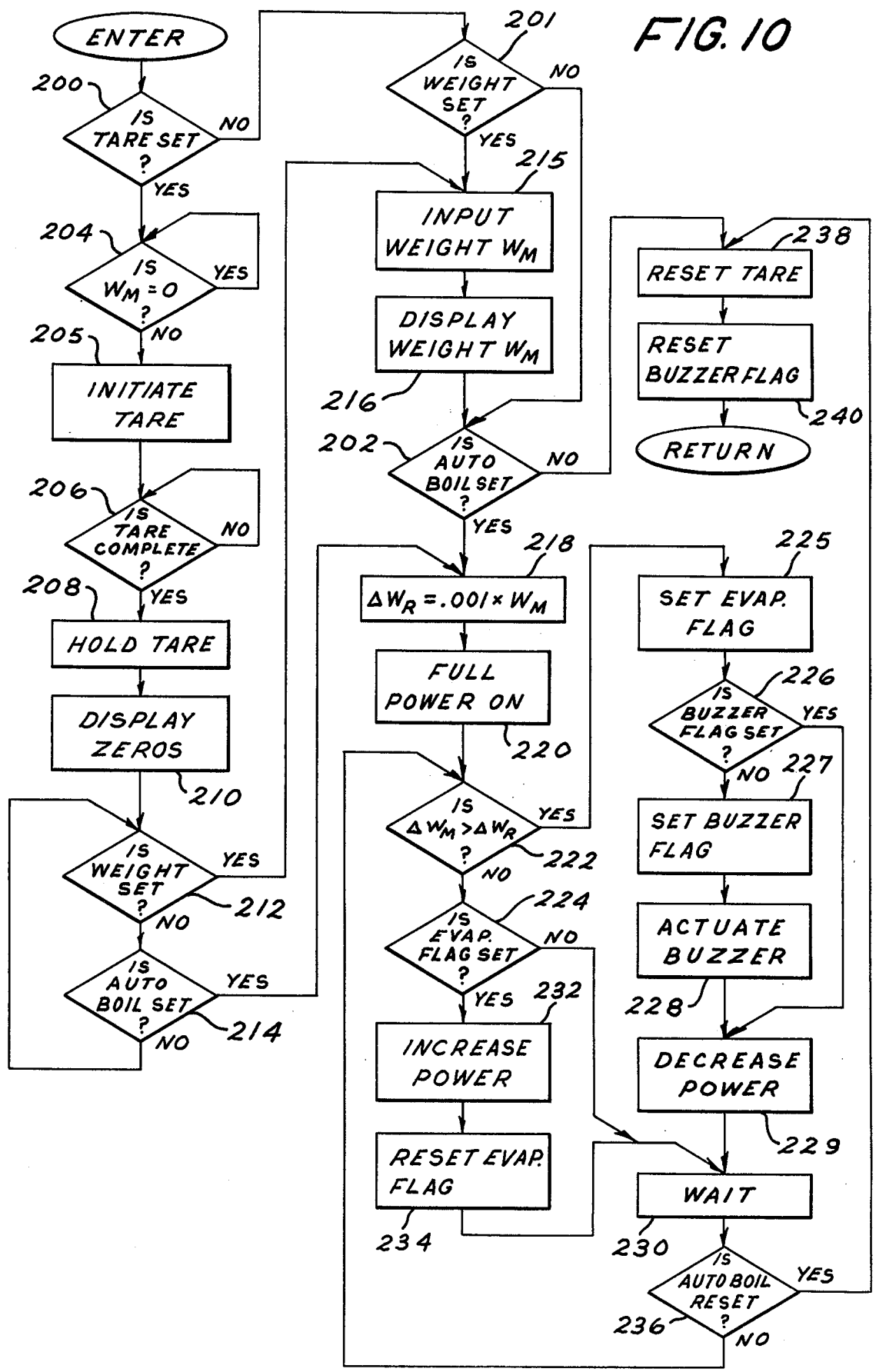
FIG. 10 is a program flow diagram illustrating a control routine employed in the microprocessor of the control circuit of FIG. 9 to control power to the heating element as a function of the rate of change of the weight of the food being heated.

Operation of the circuit of FIG. 9 will now be described with reference to the flow diagram of FIG. 10. This flow diagram illustrates the algorithm which is implemented in a portion of the ROM of microprocessor 106 to control the circuit in accordance with the invention. It is of course to be understood that other portions of the microprocessor ROM may be utilized to carry out additional control functions such as implementing the power level selection input by the user for heating elements when the range is operated in a conventional manner.

The user selects the desired one of the tare, weight and AUTO BOIL options by actuating switches 26, 28 or 30, respectively. Microprocessor 106 is programmed to periodically enter the weight routine illustrated in FIG. 9. Upon entering the routine, Inquiry 200 checks input port K1 to determine if the tare option has been selected. If not, Inquiry 201 checks input port K4 to determine if the weight option has been selected. If neither the tare nor the weight option has been selected, Inquiry 202 checks input port K8 to determine if the AUTO BOIL option has been selected. If none of these options has been selected, the program returns to the main control program.

Generally when the user wishes to use either the weight or the AUTO BOIL option, the user will first select the tare option to tare out the weight of the utensil to be used. To do so the user first places the empty utensil on heating element 12 and actuates tare switch 26. This selection is detected by Inquiry 200, and Inquiry 204 determines whether a utensil has been placed on surface unit 12 by checking the frequency of the signal applied to input port K2, and waiting until the frequency is greater than 1 KHz, indicating that a load has been placed on the surface unit resulting in a measured weight $W_M$, greater than zero. Upon detecting such a frequency, microprocessor 106 initiates the tare determination (Block 205) by generating a trigger signal at output port R7. The trigger signal at R6 closes internal switch A of analog switch 130 causing the tare voltage at the output of integrating amplifier 128 to begin to rise. Inquiry 206 delays the program until the frequency of the signal at K2 drops to less than 1 KHz signifying that the tare signal from amplifier 128 has risen to a level substantially equal to the voltage signal from amplifier 122 representing the weight of the utensil. Upon detection of this condition, the tare voltage at the non-inverting input is held at that level by terminating the trigger signal at R7 (Block 208), thereby opening switch A of analog switch 130. Next, all zeros are displayed by display 168 (Block 210) usually indicating to the user that the tare determination has been completed. The program then determines whether the user has closed switch 28 to select the weight determination option (Inquiry 212) or closed switch 30 to select the AUTO BOIL option (Inquiry 214). If neither has been selected, the program waits until the user deactuates the tare switch 26 and actuates either the weight switch 28 or the AUTO BOIL switch 30.

In the next step in the net weight measurement, the user having observed the display of all zeros deactuates the tare switch and then places the contents to be weighed in the utensil. This may be done with the utensil on the surface unit or the user may remove the utensil. With the loaded utensil in place on the surface unit, the user then actuates switch 28 to initiate a weight determination. Upon detecting the actuation of weight switch 28, the frequency of the signal at input K2 to microprocessor 106 representing the weight of the load on the surface unit 12 is determined (Block 215) and this weight is displayed by display 168 (Block 216). Since the tare voltage of the non-inverting input of amplifier 126 has been adjusted to null the weight of the utensil, the frequency of the signal at K2 now represents the net weight contents of the utensil.

Of course, the user could determine the gross weight of utensil and contents, if desired, by actuating switch 28 directly without first selecting the tare option, in which case the program would be entered via Inquiries 200–201. The weight information input at K2 (Block 215) and displayed (Block 216) would then represent the gross weight of the utensil and its contents since the tare voltage would be zero.

Having displayed the weight, or determined that neither the tare option or the weight option has been selected, the program then determines whether the AUTO BOIL option has been selected (Inquiry 203); if not, the program exits the subroutine. If the AUTO BOIL option has been selected, the microprocessor 106 implements the hereinbefore described method of varying the power level applied to the heating element as a function of the rate of evaporation of the liquid being heated so that the power level is automatically maintained at the level needed to maintain a minimum rate of evaporation.

In carrying out this method, the reference change in weight $\Delta W_R$ representing the desired evaporation rate must be determined. The desired minimum evaporation rate for the liquid being heated is set at a predetermined percent per measurement interval. The desired evaporation rate is somewhat arbitrarily set at 12 percent of the initial weight per hour which corresponds to 0.10 percent per measurement interval for the measurement interval of thirty seconds employed in this embodiment. Thus, the reference value $\Delta W_R$ is set at 0.10 percent of the initial weight. A change in weight in any measurement interval exceeding this value, signifies an evaporation rate higher than the desired rate. For example, if the initial weight of the liquid to be heated is 2 lbs., the reference value $\Delta W_R$ would be 0.002 lb.

Referring again to FIG. 10, the reference value $\Delta W_R$ is calculated at the beginning of the AUTO BOIL cycle by reference means internal to microprocessor 106 represented by Block 218 with $W_{MO}$ representing the initial net weight of the liquid or liquid and food load to be heated. Therefore, the reference means provides an internal signal representing the reference value $\Delta W_R$. Next, the triac trigger signals output at R8 are generated to implement the maximum power level for heater 12 (Block 220). The present weight of the food load $W_M$ sensed by the bridge network as represented by the frequency of the signal at K2 is checked by the microprocessor. Rate detection means internal to microprocessor 106 subtracts the present weight measurement from the immediately preceding weight measurement and generates an internal signal representing $\Delta W_M$ the change in measured weight $W_M$ since the last measurement. This $\Delta M$ represents the present rate of decrease of the measured weight.

Comparing means indicated by Inquiry 222 compares this signal $\Delta W_M$ with the reference signal $\Delta W_R$. During the initial portion of the cycle, a No to Inquiry 222 signifies that the boiling point has not been reached. Since no decrease greater than $\Delta W_R$ has yet been detected, the evaporation flag, signifying when set that boiling has been detected, is not yet set (Inquiry 224) and the program loops via Blocks 230 and 236 (to be described hereinafter) waiting for that initial decrease in the measured weight $\Delta W_M$ greater than the reference decrease $\Delta W_R$ signifying the boiling point has been reached and rapid evaporation has begun. Upon detection of that initial decrease, the evaporation flag is set (Block 225). It will be recalled that in accordance with one aspect of the invention, a signal is to be provided to the user indicating that boiling has begun. In this embodiment, a buzzer or tone generator is energized by microprocessor 106 upon initially detecting a $\Delta W_M$ greater than $\Delta W_R$. Thus, when the first Yes to Inquiry 222 is detected, the buzzer flag has not been set as determined by Inquiry 226. The buzzer flag is set (Block 227) and a trigger signal is generated at output port R4 to energize buzzer 196. On subsequent occurrences of a Yes at Inquiry 222 during the heating period, Inquiry 226 will bypass the buzzer actuating instructions (Blocks 227 and 228).

Having detected an evaporation rate greater than the desired rate, power control means internal to microprocessor 106 decreases power to the surface unit 12 from the full power setting to the next lower setting (Block 229) by appropriately altering the trigger signal provided at input port R8, and the program waits for a predetermined sampling interval before taking the next weight measurement (Block 230) and repeating the control steps. This interval between measurements allows the food load and heating element to reach a steady state operating condition at the new power level. A sampling interval on the order of 30 seconds is considered sufficient for most typical food loads likely to be heated using this option. If the next measurement indicates $W_M$ has decreased between measurement intervals by an amount greater than $\Delta W_R$ (Inquiry 222), power is again reduced (Block 229). This process continues until no decrease in $W_M$ greater than $\Delta W_R$ is detected. At this stage of the cycle, having already reached the boiling point, the Evap Flag is set (Inquiry 224). Thus, when the condition of no weight decrease greater than $\Delta W_R$ is detected, power is increased by one power level (Block 232) to the next higher power level, which level represents the lowest level sufficient to maintain an evaporation rate above the reference rate. The Evap Flag is reset (Block 234). $W_M$ continues to be periodically sampled. Typically, the power level will oscillate between the lowest power setting at which no decrease greater than $\Delta W_M$ is detected and the next higher power setting for the balance of the cooking period until the user terminates the AUTO BOIL mode by deactuating the AUTO BOIL switch 30. Inquiry 236 checks input port K8 to see if switch 30 has been deactuated by the user to terminate the heating period. If not, the program returns to Block 218 for the next weight change determination. If the switch 30 has been deactuated, the tare circuit is reset (Block 238) by generating a reset signal at output port R6 which closes internal switch B of switch 130 to discharge capacitor 146 and remove the tare signal voltage, the buzzer flag is reset (Block 240), and the program exits the subroutine.

It will be apparent from the foregoing description that the present invention provides a method and apparatus for of controlling power applied to a cooking appliance surface unit and enabling the user of the appliance to boil liquids with significantly greater energy efficiency and which reduces the likelihood of the liquid being boiled away if left unattended.

While a specific embodiment of the present invention has been illustrated and described herein, it is realized that modifications and changes will occur to those skilled in the art to which the invention pertains. For example, while in the illustrative embodiment the utensil containing the liquid to be heated is placed on a surface heating unit arranged to function both as a heating unit and as a scale platform, it is to be understood that the method of the invention could also be carried out in a microwave oven in which the floor of the oven cavity or a shelf therein is arranged to function as a scale platform for weighing the liquid content of a utensil, such as possibly a coffee mug, with the oven's magnetron functioning as the heater means. The microprocessor controlling oven operation could be programmed in accordance with the flow diagram of FIG. 10 to use the weight information to vary the output power of the magnetron, in accordance with the method of the invention hereinbefore described.

It is therefore to be understood that the appended claims are intended to cover all such modifications and changes as fall within the true spirit and scope of the invention.

What is claimed is:

1. A method of controlling the evaporation rate of a liquid being heated by an electric cooking appliance of the type having heater means and including means for controlling the output power of the heater means over a range of discrete power levels including a maximum power level, comprising the steps of:
    measuring the initial weight of the liquid to be heated;
    energizing the heater means at a predetermined power level;
    repetitively measuring the present weight of the liquid being heated during the cooking period;
    computing the rate of change of the weight of the liquid being heated;
    comparing the computed rate of change to a reference rate of change corresponding to a desired evaporation rate to detect a rate of change greater than the reference rate signifying that the liquid has begun to boil; and
    decreasing the output power of the heating means to a lower power level when the computed rate of change is greater than the reference rate, and thereafter increasing the output power of the heating means to a higher power level when the computed rate decreases below the reference rate.

2. The method of claim 1 comprising the additional step of computing the reference rate as a predetermined percentage per unit time of the initial weight.

3. A method of controlling a cooking appliance to detect when a liquid being heated by the cooking appliance has begun boiling, comprising the steps of:
    measuring the initial weight of the liquid to be heated;
    energizing a heat source of the appliance for a predetermined output power level;
    repetitively measuring the present weight of the liquid being heated;
    computing the rate of change of the weight of the liquid being heated;
    comparing the computed rate of change to a reference rate of change to detect when the computed rate of change first exceeds the reference rate of change signifying that the liquid has begun to boil; and
    signifying to the user that boiling has begun when the rate of change in excess of the reference rate is first detected.

4. The method of claim 3 wherein the step of signalling to the user comprises the step of generating an audible signal.

5. The method of claim 3 further comprising the steps of:
    following initial detection of a computed rate greater than the reference rate, reducing the output power level of the heat source to a lower level when the computed rate is greater than the reference rate and raising the output power level to a higher level when the computed rate is less than the reference rate.

6. The method of claim 5 wherein the step of signalling to the user comprises the step of generating an audible signal.

7. A method of controlling the operation of a cooking appliance which includes at least one weight measuring platform for supporting an utensil containing food items or liquid to be heated, and heating means selectively energizable at a plurality of non-OFF power levels including a maximum power level; said method including the steps of:
    providing a weight signal representative of the present weight of the contents of the utensil placed on the platform for heating;
    providing a signal representative of a reference rate of change of the utensil content weight;
    repetitively computing the present rate of change of the weight of the utensil contents and generating a signal representative of the present rate;
    comparing the present rate signal with the reference rate signal to detect when the computed rate of change exceeds the reference rate signifying that the liquid has begun to boil; and
    lowering the power level applied to the heating means to the next lower power level upon detecting a rate of change exceeding the reference rate and raising the power level applied to the heating means to the next higher power level upon subsequent detection of a rate of change less than the reference rate.

8. The method of claim 7 further comprising the step of generating a signal detectable by the user upon detection of the first occurrence of a present rate greater than the reference rate.

9. A power control arrangement for a cooking appliance comprising:
heating means adapted for selective energization by an external power supply at a plurality of output power levels;
platform means arranged to support loads placed thereon for heating by said heating means;
means for selectively controlling the output power level of said heating means to provide a plurality of output power levels;
means for measuring the weight of the load placed on said platform means and generating a weight signal representing said weight;
means for periodically sampling said weight signal, determining the rate of change of said weight and generating a rate signal representing said rate of change of said weight;
means for comparing said rate signal with a reference rate signal representing a desired evaporation rate and generating a compare signal when said rate signal exceeds said reference rate signal signifying that the liquid has begun to boil; and
power control means responsive to said compare means and operative to decrease the output power level of said heating means to a lower non-OFF power level in response to said compare signal.

10. The power control arrangement of claim 9 wherein said power control means is further operative to increase the output power level of said heating means when said compare signal indicates said detected rate is less that said reference rate.

11. A power control arrangement for a cooking appliance comprising:

a surface heating unit adapted for selective energization by an external power supply to provide a plurality of non-OFF output power levels and arranged to carry loads placed thereon for heating;
power control means for selecttively applying power to said surface heating unit at a plurality of power levels;
weight sensing means for measuring the weight of loads placed on said surface heating unit and generating a weight signal representing said weight;
rate means responsive to said weight signal operative to determine the rate of change of said weight and generate a rate signal representing said rate of change;
comparing means responsive to said rate means and operative to periodically compare the rate of change of said weight to a predetermined reference rate said reference rate representing a desired evaporation rate for liquid being heated by said heating unit; and
said power control means being responsive to said comparing means and operative to decrease the level of power applied to said surface unit to a lower non-OFF power level when a rate of change greater than said reference is detected.

12. The power control arrangement of claim 11 further comprising audible signal generating means responsive to said comparing means operative to generate an audible signal upon the initial detection of a rate of change greater than said reference rate signifying to the user that the liquid being heated has begun to boil.

13. The power control arrangement of claim 11 wherein said power control means further comprises means for increasing the level of power applied to said surface unit when a rate of change less than said reference level is detected.

14. The power control arrangement of claim 13 further comprising audible signal generating means responsive to said comparing means operative to generate an audible signal upon the initial detection of a rate of change greater than said reference rate signifying to the user that the liquid being heated has begun to boil.

* * * * *